United States Patent Office.

CHARLES SPARKS, OF DOWNERS GROVE, ILLINOIS.

Letters Patent No. 64,805, dated May 14, 1867.

---

IMPROVED COMPOUND FOR WELDING STEEL.

---

*The Schedule referred to in these Letters Patent and making part of the same.*

---

TO ALL WHOM IT MAY CONCERN:

Be it known that I, CHARLES SPARKS, of Downers Grove, in the county of Du Page, in the State of Illinois, have invented a new and improved Compound for Welding Steel without borax; and I do hereby declare that the following is a full and exact description thereof:

Two ounces of copperas, one ounce of saltpetre, one half ounce of sal ammonia, six ounces of common salt, two ounces of sal soda, three pounds of clean sand, one pound of wood ashes; the whole to be thoroughly pulverized together.

The nature of my invention consists in the use of the above-described compound in welding steel. The nature of the different substances and chemicals acting together upon the steel causes it to unite equally as well as when borax is employed. The great advantage this compound has over borax is in its cost. It answers the purpose equally as well, and costs but a small proportion of what borax would to do the same work.

What I claim as my invention, and desire to secure by Letters Patent, is—

The use of the above-described compound for welding steel.

C. SPARKS.

Witnesses:
    C. G. EARLE,
    D. O. COLE.